W. E. HIBLER.
ATTACHMENT FOR CORN PLANTERS.
APPLICATION FILED MAY 10, 1918.

1,297,847.

Patented Mar. 18, 1919.
2 SHEETS—SHEET 1.

Inventor
William E. Hibler,

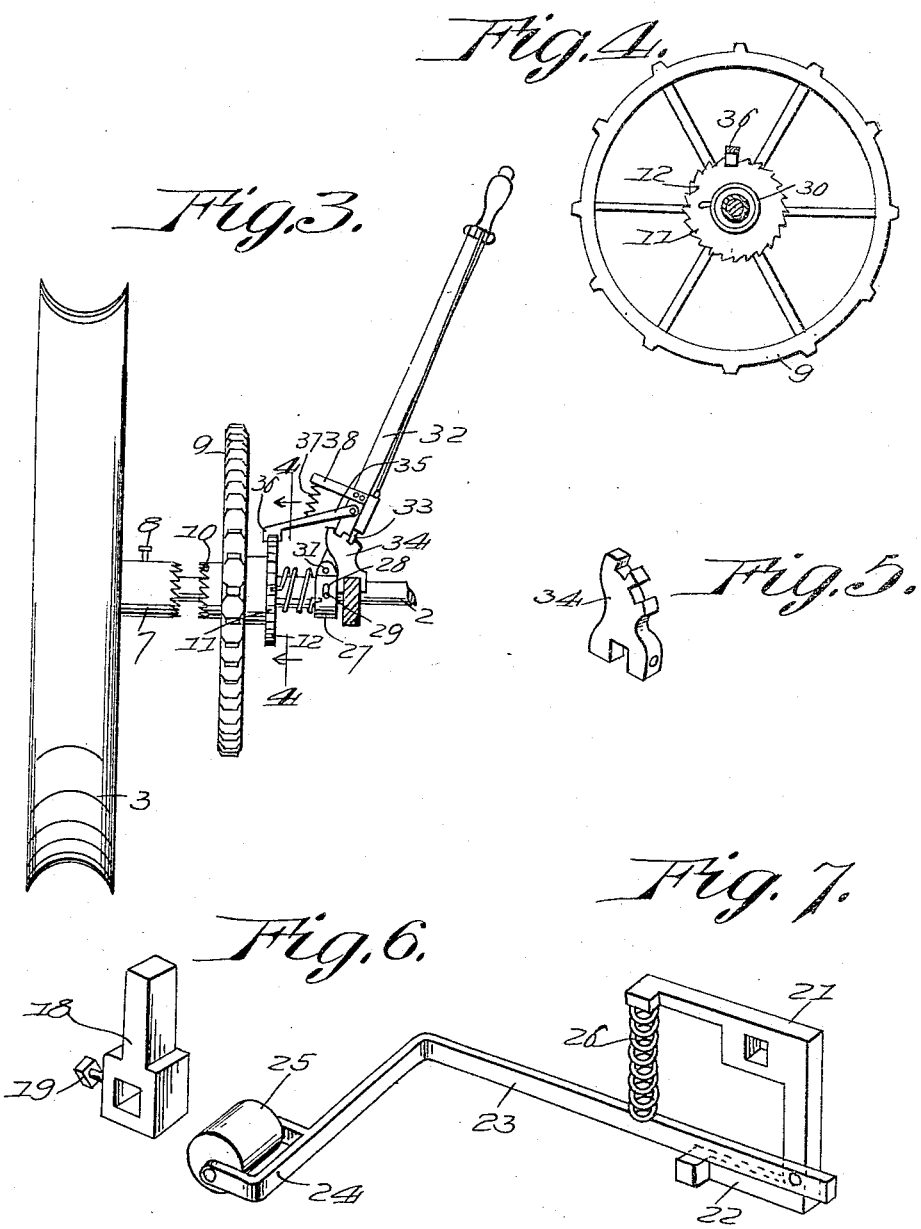

UNITED STATES PATENT OFFICE.

WILLIAM E. HIBLER, OF HONOLULU, TERRITORY OF HAWAII.

ATTACHMENT FOR CORN-PLANTERS.

1,297,847.  Specification of Letters Patent.  Patented Mar. 18, 1919.

Application filed May 10, 1918. Serial No. 233,795.

*To all whom it may concern:*

Be it known that I, WILLIAM E. HIBLER, a citizen of the United States of America, residing at Schofield Barracks, in the city and county of Honolulu and Territory of Hawaii, have invented new and useful Improvements in Attachments for Corn-Planters, of which the following is a specification.

The principal object of the invention is to provide an attachment for agricultural machines and particularly for corn planters, whereby the use of the well known check wire will be unnecessary.

A still further object seeks to provide a device of this kind which is simple in construction, but yet durable and effective in operation and inexpensive to manufacture and install.

Other and further objects will appear as the invention is set forth in detail.

The drawings illustrate and the specification describes a particular embodiment of the invention, but to this, however, it is not to be restricted. Continued use in practice may make manifest certain desirable changes or alterations and the right is claimed to make any which do not deviate from the scope of the annexed claims.

The same numerals of reference designate the same parts throughout the several figures of the drawings, wherein:

Fig. 3 is a section on the line 3—3 of Fig. 1 but shows only that side of the machine on which the controlling mechanism for the attachment is mounted.

Fig. 4 is a section on the line 4—4 of Fig. 3.

Fig. 5 is a perspective view of the tooth sector with which the clutch operating lever is conjoined.

Fig. 6 is a perspective view of the arm attached to the valve rock shaft.

Fig. 7 is a perspective view of the marker and its attendant support.

Figure 1:
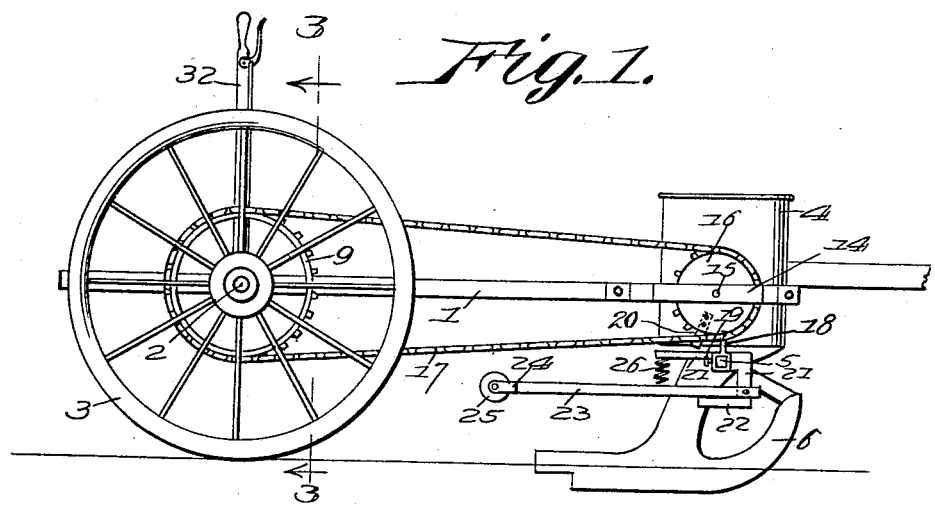
Figure 1 is a view in side elevation, showing the invention applied to a conventional corn planter.
Figure 2:
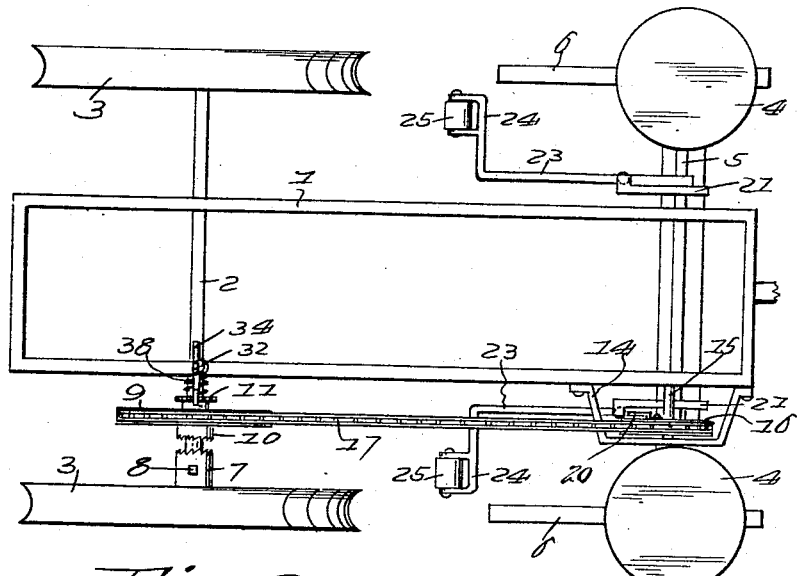
Fig. 2 is a top plan view of the structure shown in Fig. 1.

Referring to the drawings there is shown, a conventional corn planter having the frame 1, the fixed axle 2 on which the wheels 3 are journaled, the seed boxes 4, the valve operating rock shaft 5 and the stub runner 6, all of which are assembled and operate in the ordinary well known manner.

The invention consists of the several parts about to be described specifically. A clutch member 7 is attached to the inner end of the hub of one of the wheels 3, preferably that wheel on the right hand side of the machine and this clutch member is secured to the hub by a set-screw 8 or by any other of the well known means of attachment.

The axle 2 is, of course, stationary, as is usual with this class of machines and there is journaled on the axle, adjacent that wheel 3 which is equipped with the clutch member 7, a relatively large sprocket wheel 9. This sprocket wheel 9 is provided with a hub 10 which extends laterally on either side of the wheel, that end of the hub facing the clutch member 7 being formed on its end so as to provide a coöperating clutch member for the clutch member 7. That end of the hub 10 opposite the end just referred to has formed thereon a peripheral flange 11 which is provided with a series of ratchet teeth 12 spaced uniformly around its circular edge. This flange 11 and its teeth 12 are provided for a purpose which will be later described.

In the vicinity of the seed box 4 which is positioned on the same side of the machine as that whereon the clutch member 10 is carried, there is attached a bracket 14 which is connected to the frame 1 and which stands in spaced relation to the latter. A fixed shaft 15 is attached between this bracket and the frame 1 and this shaft carries rotatably mounted thereon, a sprocket wheel 16, a chain 17 being trained over this latter sprocket and over sprocket wheel 9, thereby connecting the two sprockets.

The fork usually carried by the valve operating rock shaft 5 is removed and in its place there is attached an arm 18 which is rigidly secured to the rock shaft by means of set-screw 19. The rock shaft 5 controls the seed boxes on both sides of the machine and its rocking by angular movement being imparted to the arm 18 results in operating the valves of both the seed boxes. The means for imparting angular movement of this arm 18 comprises an off set arm 20 which is attached by a bolt or any other suitable means to the sprocket wheel 16, so that this off set arm is radially disposed with reference to the center of the wheel 16.

There is also attached to the rock shaft 5 in any suitable manner a L-shaped bracket 21, this bracket being attached to the rock shaft near the juncture of its shorter and longer legs. In the normal position of the bracket 21, the longer legs are designed to lie in a horizontal plan thus giving the shorter legs a vertical position. A right angled extension 22 projects from the end of the shorter leg and lies parallel with the longer leg. A rod member 23 is pivotedly attached to the shorter leg adjacent to the extension 22 and the latter precludes the movement of this rod member below the horizontal position except when the L-shaped bracket as a whole is moved by an angular movement being imparted to the rock shaft. The free end of the rod member 23 is formed at its end with a fork 24 between whose legs a roll 25 is rotatably mounted. The rod 23 is held normally in parallel relation to the bracket 21 by means of a spiral spring 26 which is attached to the two and compressed between the rod member and the free end of the longer leg of said bracket.

A collar 27 is loosely mounted on the axle 1, this collar being provided with a slot 28 formed in its circular face. A pin 29 fixed in the axle loosely engages the slot and precludes the movement of the collar longitudinally along the axle but permits a certain amount of angular movement, the arc of which is limited by the length of the slot.
A spiral spring 30 encircles the axle and is positioned between the flange 11 and the collar 27. This spring, however, does not bear upon the flange but has its end which is adjacent to the flange suitably fixed in the axle, the other end of the spring being connected to the collar 27, and the torsion of the spring tends normally to keep the collar so positioned that one end of the slot 28 engages and abuts the pin 29.
The collar 27 is provided with two ears 31 which are made integral parts of the collar and are so positioned on the circumference thereof that they stand substantially above the axle 2. Between these two ears 31, there is pivotally attached a hand lever 32 which carries a conventional form of a latch 33, this latch being positioned on that side of the lever opposite the side which faces the sprocket wheel 9. This latch 33 is adapted to engage between either two teeth of a three tooth sector 34 which is made an integral part of the collar 27 and has its teeth formed on an arc concentric with the arc of movement of the engaging end of the latch 33, this engaging end of the latch defining an arc as the lever 32 is moved on its pivoted connection with the collar.

The lever 32, besides carrying the latch 33 also carries a small arm 35 which is pivotally connected to the lever at a point just above its pivotal connection with the collar. This arm 35 terminates in a fork 36 which is disposed substantially at right angles to the length of the lever and which is adapted to straddle the circular edge of the flange 11, the transverse portion of this fork engaging the ratchet teeth 12 of the flange. The arm 35 is held yieldingly against the flange 11 by means of a compression spring 37 which is compressed between the arm and the free end of the laterally extending member 38 which is suitably and rigidly attached to the lever 32.

In the use of the attachment, the lever 32 serves as a means for shifting the sprocket wheel 9 along the axle to and away from the adjacent wheel 3, depending on whether the latch 33 engages between the intermediate tooth of the sector 34 and that tooth adjacent the collar 27 or whether it engages in the space between the intermediate tooth and the tooth remote from the collar. If between the two former teeth the sprocket wheel 9 is shifted along the axle 2 toward the wheel 3, when the clutch member 7 engages the clutch member formed on the hub member 10. The turning of the wheel 3 by the planter being drawn over the ground, causes the sprocket wheel 9 to turn and with it the sprocket wheel 16 which, once in each revolution brings its arm 20 into contact with the arm 18, thereby rocking the rockshaft 5 and operating the valves of the seed boxes 4 and permitting them to deposit seed in the ground from the rear of the stub runners 6. The movement imparted to the rock-shaft 5, results in a similar angular movement being imparted to the brackets 21 (one of which stands on each side of the machine adjacent to the stub runners thereof), this angular movement serving to lower the free ends of the rod members 23 and to bring their rolls 25 into contact with the ground, thereby marking the point at which the seed is deposited, since the rod members are so proportioned that they bring the rolls 25 into contact with the ground at the points where the stub runner deposits the seed. The springs 26 conjoined with the rod members permit the rolls 25 being brought yieldingly into contact with the ground, so that there may not be imposed any undue strain on the rod members or on any of their attendant parts.

The shifting of the lever 32, so that the latch 33 engages between the two teeth of the sector 34 which are remote from the collar 27, serves to separate the clutch member formed on the hub 10 from the clutch member 7, whereupon the sprocket wheel 9 becomes inactive even though the wheel 3 may continue to rotate. This arrangement provides means for rendering the attachment inoperative when moving the machine and when it is not desired to deposit seed from the seed boxes.

In the use of the attachment, the latter is thrown into an operative position and the initial planting operation performed by effecting the movement of the planter across the field. At each operation of the valves conjoined with the seed boxes, the points where the seeds are deposited are marked by the rolls 25. When the planter has reached the end of the field, the attachment is thrown in the inoperative position and the planter turned around preparatory to the movement back across the field. The planter is then stopped in the position, so that the outlet of the stub runners will be in alinement with the marks previously made by the rolls 25. If the arm 20 is then not in a position to operate the rock shaft 5 it may be conveniently moved to the position for such operation by oscillating the hand lever 32 in a plane right angularly disposed with reference to the plane in which the lever is operated for engaging or disengaging the clutch member. This oscillating movement of the lever 32 is effected against the torsion of the spring 30 and its arc of movement is limited by the length of the slot 28. The oscillation of the hand lever 32 results in the arm 35 ratcheting over teeth 12 on one movement, while the reverse of this movement causes the arm to engage the teeth and to impart an angular movement to the sprocket wheel 9. This oscillatory movement of the lever 32 results in the intermittent shifting of the sprocket 9 around the axle 2 and the final bringing of the arm 20 in a position for moving the arm 18 and with it the rock shaft 5, whereon the lever 32 is operated to engage the two clutch members, after which the planter may continue on its movement across the field when it will operate the seed boxes to plant seeds at points in alinement with the points with which the seed was planted on the previous movement across the field.

When the clutch members are engaged, the forward movement of the planter results in the arm 35 ratcheting the teeth 12, as the teeth are so shaped and positioned as to permit this ratcheting movement on the forward movement of the planter.

It is obvious that the diameters of the two sprocket wheels may be varied with reference to the main wheels, so that all the wheels will be of the proper relative sizes to cause the operation of the seed-boxes at the proper time in the different rows planted the average distance apart.

The invention having been described what is claimed as new and useful is:

1. The combination with a corn planter having seed boxes and a rock shaft for operating the valves of said seed boxes, of a clutch controlled means for operating the rock shaft, L-shaped brackets carried by the rock shaft, the L-shaped brackets having right angled extensions at the ends of their shorter legs, rod members pivotedly connected to the L-shaped brackets adjacent their juncture with the extensions, the rock members having forked ends, rolls rotatably mounted in said forked ends, and a spring compressed between the rod members and the longer legs of the L-shaped brackets.

2. The combination with a corn planter having seed boxes and a rock shaft for operating the valves of said seed boxes, of a clutch member secured to one of the planter wheels, a sprocket wheel journaled on the planter axle and provided with a clutch member for engaging the aforesaid clutch member, a sprocket wheel journaled on the planter frame, a chain connecting the two sprocket wheels, means conjoined with the rock shaft and with the said second sprocket whereby the rock shaft is operated, a collar loosely mounted on the planter axle, a hand lever pivotedly connected with the collar, a latch carried by the hand lever, a collar having a toothed sector with which the latch engages, means providing for a specified amount of angular movement of the collar on the axle, and connections between the hand lever and the first said sprocket, whereby the clutch members may be engaged or disengaged or the sprocket wheels moved intermittently in one direction.

3. The combination with a corn planter having seed boxes and a rock shaft for operating the valves of said seed boxes, of a clutch member connecting with one of the planter wheels, a sprocket wheel journaled on the planter axle and provided with a clutch member for engaging the aforesaid clutch member, a sprocket journaled on the planter, a chain connecting the two sprocket wheels, an arm attached to the rock shaft, an arm attached to the second sprocket wheel and adapted to engage the aforesaid arm, a collar loosely mounted on the planter axle, the collar having a slot in its circular surface, a pin fixed in the axle and engaging the slot, a toothed sector connecting with the collar, a hand lever pivotedly mounted on the collar, a latch carried by the hand lever and engaging the toothed sector, the first said sprocket wheel being provided with a peripheral flange on its hub which flange carries ratchet teeth, an arm pivotedly connected to the hand lever and having a forked end which straddles the flange transversely and engages the ratchet teeth, a spring bearing upon said arm, and a spring in surrounding relation to the axle and having one end attached thereto and the other end attached to said collar.

In testimony whereof I affix my signature.

WILLIAM E. HIBLER.